Patented Apr. 10, 1934

1,954,353

UNITED STATES PATENT OFFICE 1,954,353

MATERIAL FOR DECORATING SURFACES

Arthur H. Ernst, Woodbridge, N. J., assignor, by mesne assignments, to E. I. du Pont de Nemours and Company, a corporation of Delaware No Drawing. Application March 15, 1930, Serial No. 436,251

6 Claims. (Cl. 106—36.2)

This invention relates to the production of non-tarnishing coatings of precious metals upon ceramic ware, glass, metals, and the like.

It is known that organic liquids containing precious metals in colloidal or finely divided state or in the form of dissolved or suspended compounds may be applied to surfaces, and a coating of the metal produced upon the same by heating the article thus painted to temperatures at which the organic liquid is burned away and the metal fixed to the surface. However, the appearance of the final product varies considerably with the liquid compositions used. Furthermore, the uniformity of the coating, its permanence, its coating power or quality of satisfactorily decorating a given surface with a minimum of precious metal material, its resistance to corrosive materials, etc., are influenced by the nature of the metallic constituents present and to a lesser degree by fluxing materials and salts which may or may not be used.

My invention is particularly concerned with the use on glass, porcelain, terra cotta, and other ceramic ware, although also on metals, especially aluminum, of a composition which when applied to the surface to be decorated and then burned, will form a palladium-gold alloy coating which is pleasing and uniform in appearance, non-tarnishing, permanent, non-crystalline, giving a satisfactory decoration with a minimum of precious metals, and having other advantages which make it highly desirable.

In carrying out my invention I prepare a solution or suspension of palladium and gold in a liquid vehicle, apply this to the article to be decorated and then subject it to a firing operation. By a solution of palladium and gold, I wish to be understood as including colloidal or ordinary solutions in which the palladium and gold can be in the form of colloidal metal or in the form of compounds. I may add a salt of gold, such as gold resinate, and a salt of palladium to an essential oil, alcohol, ester or other liquid or liquid mixture such as those commonly used as lacquer solvents. My preparations can also contain a fluxing material, such as resinate or chloride of bismuth, barium, tin, chromium or lead, or other suitable metal.

I have found that my preparations containing palladium and gold can be used to give a decorated surface having an appearance resembling that of the alloys known as white gold and which may be obtained by similar preparations in which platinum or its compounds are used instead of palladium or palladium compounds. However, I have found that the coatings obtained by using the palladium-gold compositions are more satisfactory for a number of reasons, in addition to being cheaper. For example, a mixture of platinum and gold resinates having a metal ratio of 13 platinum to 11 gold gives a silver-like coating, the pleasing appearance of which can be duplicated and even surpassed by the use of my compositions of palladium and gold, and costing approximately half as much. Furthermore, the coatings made with my compositions are not as susceptible to scumming as those made from platinum-gold compositions. The decorations produced upon glass by my compositions have greater adherence than do those made from platinum-gold compositions. The coating contains the gold and palladium in substantially the same ratio that they existed in the liquid composition.

The following examples serve to illustrate my invention:

Example I

Gold resinate was dissolved in oil of lavender until the solution had a metal content of 11% gold. To 10 parts of this solution there was added 4 parts of oil of lavender and 5 parts of a solution of palladium resinate in oil of lavender and containing about 4.2% palladium, calculated as metal. The resulting composition, containing about 5 times as much gold as palladium, was painted on china, glass, and aluminum articles which were then placed in an oven and heated until the decoration was burned onto the surfaces. The temperature was about 500° C. for glass and aluminum and about 710° C. to 770° C. for china. The decoration thus obtained presented a clear and brilliant grey white coating resembling polished chromium plate. The adherence proved to be excellent when tested by rotating the surface in contact with a felt pad held against the surface by a 100 gram weight.

Example II 1100 parts of a solution containing gold resinate corresponding to 11% metal content as in Example I was mixed with 120 parts of an alcoholic solution containing 10 parts of bismuth subnitrate, 1.5 parts chromium oxyhydrate and 8 parts by weight of an aqueous solution of rhodium chloride containing 17.75% rhodium chloride. 10 parts of this gold and flux mixture was then mixed with 5 parts of palladium resinate containing about 4.2% palladium as metal content. The resulting preparation, containing about 4.7 times as much gold as palladium, when used as in Example I gave similar satisfactory results and even greater adherence of the uniform bright grey coating. The ratio of the weights of the fluxing compounds in this example is about as follows:

| | Percent |
|---|---|
| Bismuth subnitrate | 77 |
| Chromium oxyhydrate | 12 |
| Rhodium trichloride | 11 |
| | 100 |

A flux containing these compounds in the proportions given or containing equivalent compounds in corresponding proportions has proved especially satisfactory with the palladium-gold compositions, especially when used in such proportions with gold that the ratio of flux metals to gold is about 1 to 14 as in this example.

*Example III*

12 parts of gold resinate dissolved in essence and containing 11% gold, calculated as metal, was mixed with 12 parts of palladium resinate having a palladium metal content of 4.3%, 3 parts of turpentine solution of bismuth resinate having a content of $Bi_2O_3$ equivalent to 7% by weight, and 5 parts of essence, the total mix constituting 32 parts. This composition was applied to surfaces and burned as in Examples I and II with similar results and giving a bright white decoration. In this example, the ratio of gold to palladium metal calculates to about 2.6 times as much gold as palladium.

Although my invention is not limited to the use of liquid preparations containing any definite ratio of gold to palladium, and although the grey or white colored coatings described under the above examples can be changed to have various shades of yellow by increasing the gold ratio, I much prefer to keep the ratio of gold to palladium within the limits of equal amounts of each up to ten times as much gold as palladium. Below one part of palladium to ten parts of gold the decoration begins to take on a yellow color and above one part of palladium to one part of gold the decoration begins to have a green coloration. Within my preferred limit of ratios the coatings are more adherent and permanent.

The palladium resinate used in the above three examples was made by mixing palladium chloride solution and Passau balsam and heating at 50° C., until the HCl was driven off, after which, essence was added until the solution contained about 4.2% palladium, calculated as metal. However, I do not wish to limit my invention to the use of palladium resinate, since my new coatings or decorations may be obtained by using colloidal palladium with a salt of gold or with colloidal gold metal. Furthermore, other salts of palladium than the resinate, such as salts of organic acids other than resin acids or salts of inorganic acids, for example the chloride, may be used.

What I claim is:

1. A composition which on burning at a temperature of below about 770° C. produces a substantially white adherent, non-scumming palladium-gold alloy, decorative deposit on ceramic surfaces comprising a solution of palladium and gold in an organic liquid in such quantities that the ratio of palladium metal to gold is between the limits of about equal quantities and ten times as much gold as palladium.

2. A composition which on burning at a temperature of below about 770° C. produces a substantially white adherent, non-scumming palladium-gold alloy, decorative deposit on ceramic surfaces comprising a solution of palladium and gold resinates in an organic liquid in such quantities that the ratio of palladium metal to gold is between the limits of about equal quantities and ten times as much gold as palladium.

3. A composition which on burning at a temperature of below about 770° C. produces a substantially white adherent, non-scumming palladium-gold alloy, decorative deposit on ceramic surfaces consisting of a solution of palladium and gold resinates and lesser quantities of fluxing compounds dissolved in an essential oil in such quantities that the ratio of palladium metal to gold is between the limits of about equal quantities and ten times as much gold as palladium.

4. A composition which on burning at a temperature of below about 770° C. produces a substantially white adherent, non-scumming palladium-gold alloy, decorative deposit on ceramic surfaces consisting of a solution of palladium and gold resinates in an essential oil in such quantities that the ratio of palladium metal to gold is between the limits of about equal quantities and ten times as much gold as palladium.

5. A composition which on burning at a temperature of below about 770° C. produces a substantially white adherent, non-scumming palladium-gold alloy, decorative deposit on ceramic surfaces consisting of a solution in an essential oil of palladium and gold resinates in such quantities that the ratio of palladium metal to gold is between the limits of about equal quantities and ten times as much gold as palladium, and such quantities of a flux comprising bismuth subnitrate 77%, chromium oxyhydrate 12%, and rhodium trichloride 11%, that the ratio of flux metals to gold is 1 to 14.

6. A composition which on burning at a temperature of below about 770° C. produces a substantially white adherent, non-scumming palladium-gold alloy, decorative deposit on ceramic surfaces consisting of a solution in an essential oil of palladium and gold resinates in such quantities that the ratio of palladium metal to gold is about 1 to 5 and such quantities of a fluxing material consisting of bismuth subnitrate 77%, chromium oxyhydrate 12%, and rhodium trichloride 11%, that the ratio of flux metals to gold is 1 to 14.

ARTHUR H. ERNST.